(12) United States Patent
Otten

(10) Patent No.: US 9,930,205 B2
(45) Date of Patent: Mar. 27, 2018

(54) APPARATUS AND METHOD FOR CORRECTING THE EFFECTS OF A DEVIATION OF THE POSITION OF A MOVABLE CAMERA IN A POSITIONING APPARATUS FOR THE POSITIONING OF FLEXIBLE PRINTING PLATES ON A CARRIER

(71) Applicant: Color Control B.V., Alphen aan den Rijn (NL)

(72) Inventor: Petrus Johannes Marie Otten, Vlissingen (NL)

(73) Assignee: Color Control B.V., Alphen aan den Rijn (NL)

( * ) Notice: Subject to any disclaimer, the term of this patent is extended or adjusted under 35 U.S.C. 154(b) by 736 days.

(21) Appl. No.: 13/969,360

(22) Filed: Aug. 16, 2013

(65) Prior Publication Data

US 2014/0053748 A1 Feb. 27, 2014

(30) Foreign Application Priority Data

Aug. 22, 2012 (NL) ..................................... 2009341

(51) Int. Cl.
*H04N 1/00* (2006.01)
*B41F 27/00* (2006.01)
(Continued)

(52) U.S. Cl.
CPC ........... *H04N 1/047* (2013.01); *B41F 27/005* (2013.01); *B41F 27/1262* (2013.01)

(58) Field of Classification Search
CPC .... B41F 27/005; B41F 27/1262; H04N 1/047
(Continued)

(56) References Cited

U.S. PATENT DOCUMENTS

| 5,132,911 A | 7/1992 | Leader, Jr. et al. |
| 5,633,676 A | 5/1997 | Harley et al. |

(Continued)

FOREIGN PATENT DOCUMENTS

| EP | 0672525 A1 | 9/1995 |
| EP | 0893254 A2 | 1/1999 |

(Continued)

*Primary Examiner* — Anner N Holder
(74) *Attorney, Agent, or Firm* — Rudy J. Ng; Bret E. Field; Bozicevic, Field & Francis LLP

(57) ABSTRACT

The invention relates to a correction device for correcting the consequences of a deviation in the position of a movable camera which is placed in a positioning device for flexible printing plates, wherein the camera is configured to detect at least the carrier and the device comprises display means for displaying the image detected by the camera, wherein the correction device is provided with a position reference member detectable by the camera, with position signal generating means for generating a signal representing the actual position of the camera from the signal detected by the camera, with comparing means for comparing the signal representing the actual position of the camera to the signal representing the target position of the camera and generating a correction signal, and with image correction means for correcting the image displayed by the display means using the correction signal. Positioning errors in the display of the image recorded by the camera are hereby avoided.

8 Claims, 3 Drawing Sheets

(51) Int. Cl.
*B41F 27/12* (2006.01)
*H04N 1/047* (2006.01)
(58) Field of Classification Search
USPC .......................................................... 348/95
See application file for complete search history.

(56) References Cited

U.S. PATENT DOCUMENTS

| | | | |
|---|---|---|---|
| 5,850,789 A * | 12/1998 | Rudolf | B41F 27/005 101/486 |
| 2005/0005802 A1* | 1/2005 | Dewitte | B41F 27/005 101/485 |
| 2006/0117973 A1* | 6/2006 | Zanoli | B41F 27/005 101/216 |
| 2007/0261580 A1* | 11/2007 | Otten | B41F 27/12 101/477 |
| 2011/0235923 A1* | 9/2011 | Weisenburger | G01C 11/00 382/201 |
| 2012/0304881 A1* | 12/2012 | Otten | B41F 27/005 101/481 |

FOREIGN PATENT DOCUMENTS

| | | |
|---|---|---|
| EP | 1666251 A1 | 6/2006 |
| GB | 2398038 A | 8/2004 |
| WO | WO 94/00802 A1 | 1/1994 |

* cited by examiner

APPARATUS AND METHOD FOR CORRECTING THE EFFECTS OF A DEVIATION OF THE POSITION OF A MOVABLE CAMERA IN A POSITIONING APPARATUS FOR THE POSITIONING OF FLEXIBLE PRINTING PLATES ON A CARRIER

The invention relates to a device for correcting the consequences of a deviation in the position of a camera movable in a direction of movement relative to a signal representing the desired camera position, which camera is placed in a positioning device for positioning flexible printing plates on a carrier, wherein the camera is configured to detect at least a part of the carrier and the device comprises display means for displaying the image detected by the camera.

In the positioning of printing plates, in particular flexo-printing plates, on a carrier use is generally made of a so-called mounting table. The position of the printing plate on the carrier is detected here by the camera, displayed on a monitor and the printing plate is displaced until it has reached the required position, this being visible on the monitor. The greatest possible accuracy is required in the positioning of the printing plates. Great accuracy can already be achieved through the use of cameras, although the accuracy then achieved is still subject to errors in the positioning of the camera itself. In the case of a fixedly mounted camera these errors can be easily eliminated, but in the case of movable cameras errors in positioning of the camera are unavoidable, even when accurately operating position sensors are used. This results in inaccuracy in the representation of the image record by the camera and thereby to inaccuracy in determining the position of the printing plate.

The present invention has for its object to provide a device wherein the accuracy of the printing plate position determination is further increased.

The object is achieved with a correction device of the above stated type, wherein the correction device is provided with a position reference member detectable by the camera and configured for connection to a positioning device, position signal generating means for generating a signal representing the actual position of the camera from the signal detected by the camera, comparing means for comparing the signal representing the actual position of the camera to the signal representing the desired position of the camera and generating a correction signal representing the difference between the signal representing the actual position of the camera and the signal from the position indicator, and with image correction means for correcting the image displayed by the display means using the correction signal.

Positioning errors in the display of the image recorded by the camera are reduced and avoided as far as possible by these measures.

The invention also relates to a method for correcting the consequences of the deviation in the position of a camera movable in a direction of movement relative to a signal representing the position of the camera, which camera is placed in a positioning device for positioning flexible printing plates on a carrier and the camera is configured to detect at least a part of the carrier, wherein the method comprises the steps of placing on the carrier a position reference member detectable by the camera, generating a signal representing the actual position of the camera from the image detected by the camera and representing the position reference member, comparing the signal representing the actual position of the camera to a signal representing the target position of the camera and generating a correction signal representing the deviation in the position of the camera and correcting the image displayed by the display means using the correction signal.

In a large number of mounting tables the camera is mounted on a carriage for movement in a single direction along a rail. This rail will deform as a result of temperature differences, stress in materials and vibrations. Use is also made of multiple guides in order to prevent play, so that the carriage generates mechanical stresses between the guides, whereby these usually deform. This results in errors in the direction transversely of the direction of movement of the position of the camera. Particularly in order to counter the consequences of such errors, a first preferred embodiment proposes that the position reference member comprises a tensioned thread extending parallel to the direction of movement of the camera, that the position signal generating means are configured to generate, in the different positions of the camera, the signal representing the associated actual position of the camera transversely of the direction of movement, that the comparing means are configured to compare in each of the camera positions the signal representing the actual position of the camera in the direction transversely of the direction of movement of the camera to the signal representing the desired position of the camera and to generate a correction signal representing the deviation in the associated position of the camera, and that the image correction means are configured to correct the images displayed by the display means in the direction transversely of the direction of movement of the camera using the correction signal. It is noted here that the camera positioning errors depend in most cases on the position of the camera along the rail. This embodiment thus provides the option of determining the positioning errors as a function of the position of the camera along the rail.

This embodiment likewise provides a method wherein deviations in the direction transversely of the direction of movement of the camera are compensated, a position reference member extending in the direction of movement of the camera is placed on the carrier, a correction signal representing the deviation in the position of the camera transversely of its direction of movement is generated, and the image displayed by the display means is corrected transversely of the direction of movement of the camera using the correction signal.

In order to also enable correction of positioning errors in the direction of movement of the camera, another embodiment provides a correction device wherein the position reference member comprises a scale division extending parallel to the direction of movement of the camera, the camera is coupled to a position sensor configured to display the desired position of the camera, the position signal generating means are configured to generate, in the different positions of the camera, a signal representing the associated actual position of the camera in its direction of movement, the comparing means are configured to compare the signal representing the actual position of the camera in the direction of movement of the camera to the signal from the position indicator in each of the positions of the camera, and to generate a correction signal representing the deviation in the associated position of the camera, and the image correction means are configured to correct the images displayed by the display means in the direction of movement of the camera using the correction signal. It is noted here that the errors in the direction of movement of the camera result per se in deviations in the image, but that the errors can also otherwise affect the compiling of the table or function indicating the relation between the errors in the transverse direction and the location in the direction of movement. The location in the direction of movement can after all also be affected by errors which are compensated by the measures of this embodiment.

This embodiment likewise provides a method wherein deviations in the direction of movement of the camera are compensated, a position reference member extending in the direction of movement of the camera is placed on the carrier, a correction signal representing the deviation in the position of the camera in its direction of movement is generated and the image displayed by the display means is corrected in the direction of movement of the camera using the correction signal.

It is of course possible to determine the deviation at only a single point on the path of movement of the camera and to use this to correct the whole image. Use can also be made of interpolation. It is however recommended that the operations are repeated successively in a number of positions for each of the positions of the camera. A more complete image is after all obtained hereby.

It is of course possible for the position reference member to be continuously present during positioning of the printing plates. Because such a position reference member usually obstructs handling of the printing plates, it is attractive—with the position reference member in position—to initially include the errors in a table or store them as a function. During mounting of the printing plates use can then be made of these data to correct the image recorded by the camera. It is noted that this can of course only be applied in the case of systematic errors, and that chance errors cannot be corrected. A relevant preferred embodiment therefore provides a correction device wherein the image correction means are configured to store the image correction signal and to use this signal later to correct images displayed by the display means.

This embodiment likewise provides a method wherein, following generation of the correction signal, the correction signal is stored and the correction signal is used to correct the image during positioning of the printing plate on the carrier.

As already stated in the preamble, the invention can be applied to hand-operated mounting tables wherein the image from the camera is projected onto a screen and the user slides the printing plate by hand to the desired position. The advantages of the measures according to the invention are achieved when the display means are formed by a screen.

This embodiment moreover provides a method wherein the corrected image is displayed on a screen.

It is however also possible for the invention to be applied with an automatic mounting table. A particular embodiment provides for this purpose the measure that the display means comprise a memory which is coupled to a manipulator for displacing the printing plate.

This embodiment also provides a method wherein a manipulator for displacing the printing plate is controlled on the basis of the corrected image.

The correction device according to the invention can be integrated into newly constructed mounting tables. The invention therefore relates to a positioning device provided with a correction device of the above stated type.

The present invention is elucidated hereinbelow on the basis of the accompanying drawings, in which.

Figure 1:
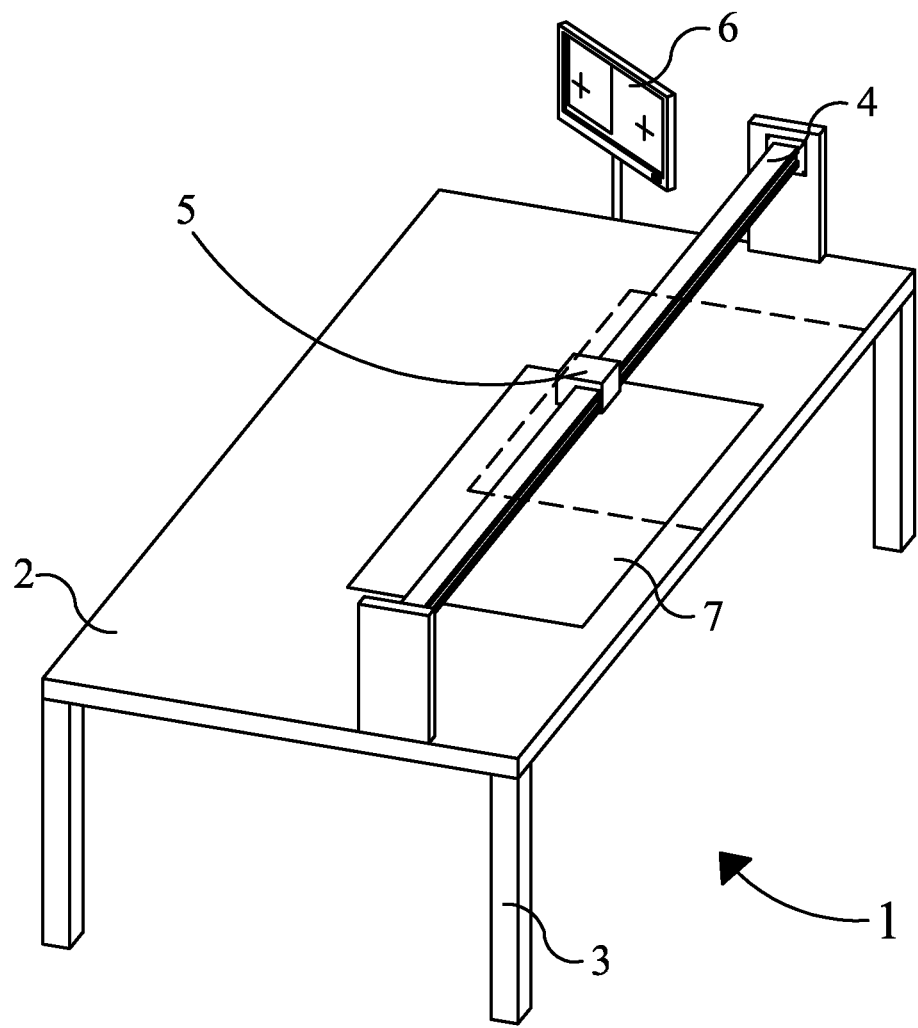
FIG. 1 is a schematic perspective view of a positioning device for printing plates provided with a correction device according to the invention.

FIG. 1 shows a positioning device designated as a whole with 1. This positioning device comprises a tabletop 2 which rests by means of a frame 3 on a ground surface. Frame 3 is provided with a horizontally extending rail 4 along which a camera 5 is movably placed. Camera 5 is provided with drive means, for instance in the form of an electric motor for moving the camera 5 along rail 4, which can be provided for this purpose with a gear rack. It is however also possible for camera 5 to be moved along the rail by means of a belt or a spindle, such as a toothed belt. The toothed belt is then driven by an electric motor connected fixedly to the frame. Camera 5 is connected to a screen 6 which is configured to display the image recorded by the camera, together with a reference indication such as a frame or two reference crosses.

Such a configuration is known from the prior art. This serves for the purpose of placing a printing plate, in particular a flexo-printing plate, at the correct position on a carrier. A carrier can be understood to mean a foil, for instance in the case a number of flexo-printing plates have to be placed adjacently of each other, but also a printing cylinder or a form cylinder; a cylinder which, provided with a number of printing plates, is placed on a printing cylinder in a printing press. Such positioning devices can take an automatically operating form but can also be configured for manual operation. FIG. 1 shows a positioning device suitable for manual operation. A printing plate 7 is placed here on tabletop 2 within the area displayed by camera 5. The image recorded by camera 5 is displayed on screen 6 together with a reference indication for the final location of the printing plate. The user then discerns how the printing plate has to be moved to the desired position and takes hold of the printing plate and transports it to said position. Such a device and method are described in the European patent application EP-A-0 672 525.

As already stated in the preamble, inaccuracies can occur in the positioning of camera 5 as a result of the mobility of camera 5. These inaccuracies result in inaccuracies in the final positioning of the printing plate, since the reference is linked to the camera position. The camera is of course controlled by a control member 8 which usually has the configuration of a computer 9, and wherein the control takes place by means of the pre-entered desired position of the printing plates. In the present embodiment the camera is provided with a positioning sensor for the purpose of displaying the position of the camera in the longitudinal direction of the rail. The position of the camera in the transverse direction of the rail is—barring errors—fixed. The present invention provides means for compensating the consequences of these errors.

In order to provide a reference use is made of a thin thread 10 which is tensioned parallel to rail 4 on the tabletop. A straight line is hereby obtained which can readily serve as reference.

The operation of the correction device will now be further described with reference to FIG. 2. Thread 10 is placed so that it is detected by camera 5. The output signal of camera 5 is thus provided with a representation of the thread. The signal is fed to a processing circuit 11 preferably accommodated in computer 9. This processing circuit determines the position of the thread in the image of the camera, and thereby the position of the camera and its possible deviation from the desired position. The processing circuit derives a correction signal from this position. The correction signal is subsequently used in order to compensate, in a compensation circuit, the image recorded by the camera and displayed on screen 6. Compensation circuit 12 is preferably also accommodated in computer 9. This results in a much more accurate reference since the errors in the camera position transversely of the rail direction are compensated.

The device and method described above with reference to FIG. 2 relate to the correction and compensation of both systematic and chance errors.

Figure 2:
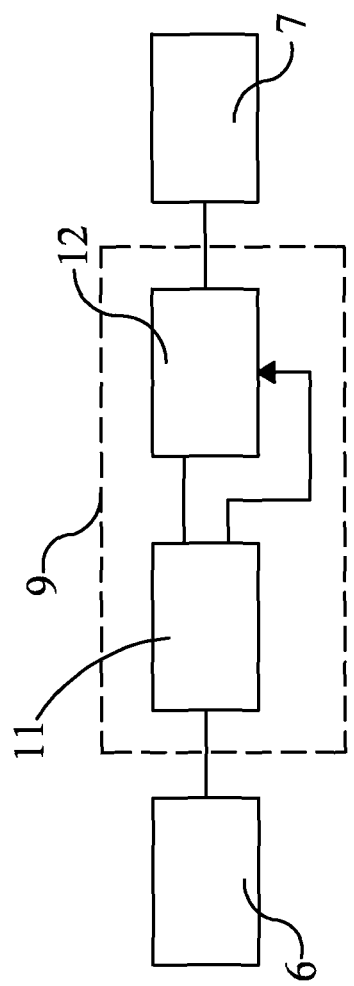
FIG. 2 shows a block diagram of a first embodiment for the purpose of elucidating the operation of the device according to the invention.
Figure 3:
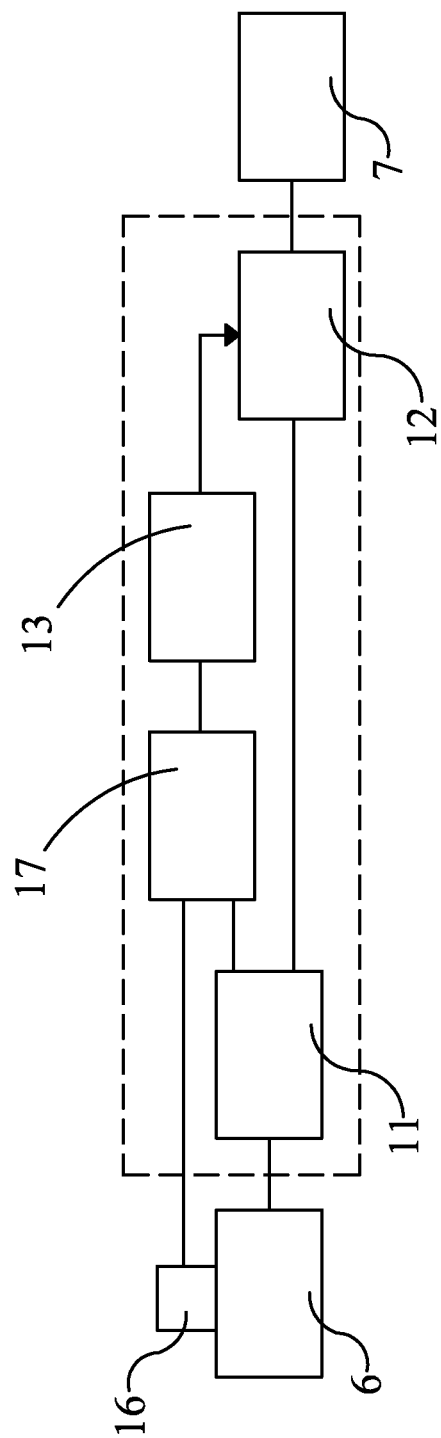
FIG. 3 shows a block diagram of a second embodiment.

The block diagram of FIG. 3 differs in a number of points from the block diagram shown in FIG. 2. It therefore relates to situations in which only systematic errors have to be compensated, so that use can be made of a corresponding device which is provided with a memory for storing the correction signal. The correction signal is initially recorded and stored here in a memory 13, and the correction signal is subsequently used during positioning of the printing plates.

The above described measures relate only to the compensation of the errors in the camera position in the direction transversely of the longitudinal direction of rail 4. It is however not possible to preclude errors also occurring in the positioning in the longitudinal direction of the rail. In order to also enable correction of such errors, according to the preferred embodiment shown in FIG. 3 a scale division 15 extending in the longitudinal direction of rail 4 is arranged on tabletop 2. They scale division falls within the area detected by camera 5. The associated output signal of the camera is therefore fed to processing circuit 11, as in the previous embodiment. In the present embodiment the processing circuit is configured to derive a signal representing the position of the camera in the longitudinal direction of the rail. Because the position of the camera in this longitudinal direction is variable, the camera is provided with a position sensor 16 which is configured to display a signal which represents the position of the camera and which is used to control the motor with which the camera is moved along the rail. In order to have available a signal representing the deviation between the position indicated by the position sensor and the actual position in the longitudinal direction of the rail, the signal from position sensor 16 and the signal from the processing circuit are fed to a comparing circuit 17 which subtracts these signals from each other, and a correction signal results which is fed to the correction circuit for the purpose of correcting, in the same manner as in the previous embodiment, the image appearing on screen 6, albeit now in the longitudinal direction of the rail instead of in the transverse direction of the rail as in the previous embodiment. It is also noted that FIG. 3 comprises a memory for storing the correction signal. It is however also possible in the correction of the image in the longitudinal direction to apply a direct compensation without memory as is the case in the compensation of the errors in the transverse direction.

The errors in the transverse direction generally depend on the position of the camera in the longitudinal direction. Consequently the correction signals are preferably stored in the form of a table in the memory. This applies for the correction signals in both the transverse direction and the longitudinal direction of the rail.

The above embodiments relate to positioning machines configured for manual positioning of the printing plates. It will be apparent that the invention can also be applied to machines which operate fully automatically. A handling member is present here which is configured to displace the printing plate to the desired position on the printing cylinder. According to the prior art, the handling member is controlled under the control of a control member such that the printing plate is moved to its desired position. When the invention is applied with such a device, the correction signal is fed to the control member.

It will be apparent that the invention within the scope of the claims also relates to devices differing from the above stated embodiments. The invention has been elucidated particularly on the basis of a camera movable in a single direction, although the invention can also be applied to a camera movable in two directions.

The invention claimed is:

1. A correction device for correcting the consequences of a deviation in the position of a camera movable in at least one direction of movement, which camera is placed in a positioning device for positioning flexible printing plates on a carrier, wherein the camera is configured to detect at least a part of the carrier on which the printing plate has to be placed, and the correction device comprises a display for displaying an image detected by the camera, wherein the correction device comprises:
   a position reference member detectable by the camera and connected directly to the positioning device;
   a position signal generator for generating a signal representing the actual position of the camera from the image detected by the camera and representing the position reference member;
   a signal comparer for comparing the signal representing the actual position of the camera to a signal representing the target position of the camera and generating a correction signal representing a difference between the signal representing the actual position of the camera and the signal representing the target position of the camera; and
   an image corrector for correcting the image displayed by the display using the correction signal.

2. The correction device as claimed in claim 1, wherein
   the position reference member comprises a tensioned thread extending parallel to the direction of movement of the camera;
   the position signal generator is configured to generate, in the different positions of the camera, the signal representing the associated actual position of the camera transversely of the direction of movement;
   the signal comparer is configured to compare in each of the camera positions the signal representing the actual position of the camera in the direction transversely of the direction of movement of the camera to the signal representing the target position of the camera and to generate a correction signal representing the deviation in the associated position of the camera; and
   the image corrector is configured to correct the images displayed by the display in the direction transversely of the direction of movement of the camera using the correction signal.

3. The correction device as claimed in claim 1, wherein
   the position reference member comprises a scale division extending parallel to the direction of movement of the camera, and that the camera is provided with a position indicator configured to generate a signal representing the camera position;
   the position signal generator is configured to generate, in the different positions of the camera, a signal representing the associated actual position of the camera in its direction of movement;
   the signal comparer is configured to compare the signal representing the actual position of the camera in the direction of movement of the camera to the signal from the position indicator in each of the positions of the camera, and to generate a correction signal representing the deviation in the associated position of the camera; and the image corrector is configured to correct the images displayed by the display in the direction of movement of the camera using the correction signal.

4. The correction device as claimed in claim 1, wherein the image corrector is configured to store the image correction signal and to use this signal later to correct images displayed by the display.

5. The correction device as claimed in claim 1, wherein the display is formed by a screen.

6. The correction device as claimed in claim 1, wherein the display comprises a memory which is coupled to a manipulator for displacing the printing plate.

7. A positioning device provided with a correction device as claimed in claim 1.

8. A method comprising correcting, using the correction device as claimed in claim 1, the consequences of the deviation in the actual position of the camera movable in a direction of movement relative to the signal representing the target position of the camera.

* * * * *